United States Patent
Boyer et al.

(10) Patent No.: US 9,773,046 B2
(45) Date of Patent: *Sep. 26, 2017

(54) CREATING AND DISCOVERING LEARNING CONTENT IN A SOCIAL LEARNING SYSTEM

(71) Applicant: International Business Machines Corporation, Armonk, NY (US)

(72) Inventors: John M. Boyer, Victoria (CA); Adam L. Cutler, Austin, TX (US); Jodi M. Cutler, Austin, TX (US); Keith MacKenzie, Victoria (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/824,039

(22) Filed: Aug. 11, 2015

(65) Prior Publication Data

US 2016/0180729 A1 Jun. 23, 2016

Related U.S. Application Data

(63) Continuation of application No. 14/576,198, filed on Dec. 19, 2014.

(51) Int. Cl.
*G06F 17/30* (2006.01)
*G09B 5/08* (2006.01)
(Continued)

(52) U.S. Cl.
CPC .. *G06F 17/30554* (2013.01); *G06F 17/30477* (2013.01); *G06Q 10/10* (2013.01);
(Continued)

(58) Field of Classification Search
CPC .................. G06F 17/3089; G06F 17/30377
See application file for complete search history.

(56) References Cited

U.S. PATENT DOCUMENTS 7,827,125 B1 11/2010 Rennison
8,402,055 B2 * 3/2013 Cepuran ............. G06Q 10/107
707/705

(Continued)

OTHER PUBLICATIONS

"Learning Management System"; retrieved from http://www.saba.com/lms/learning-management-system/; retrieved on Sep. 30, 2014.

(Continued)

*Primary Examiner* — Noosha Arjomandi
(74) *Attorney, Agent, or Firm* — North Shore Patents, P.C.; Michele Liu Baillie

(57) ABSTRACT

In analyzing learning content, a social learning system receives from at least one client system in the social learning system a creation of at least one informal course by a learning content creator. Each informal course comprises learning content and metadata describing the learning content and the learning content creator. The social learning system further receives social data from a plurality of client systems in the social learning system for the at least one informal course. When the social learning system receives a query from a learning content administrator system in the social learning system including query parameters, the social learning system searches at least one of the metadata and the social data for one or more informal courses matching the query parameters and returns a list of one or more informal courses matching the query parameters as a query result.

6 Claims, 4 Drawing Sheets

(51) Int. Cl.
*G09B 7/00* (2006.01)
*G09B 7/02* (2006.01)
*G06Q 10/10* (2012.01)
*G06Q 50/20* (2012.01)

(52) U.S. Cl.
CPC ............... *G09B 5/08* (2013.01); *G09B 7/00* (2013.01); *G09B 7/02* (2013.01); *G06Q 50/20* (2013.01)

(56) References Cited

U.S. PATENT DOCUMENTS

| | | | |
|---|---|---|---|
| 8,719,251 | B1 | 5/2014 | English et al. |
| 8,831,205 | B1* | 9/2014 | Wu ..................... H04M 3/5233 370/352 |
| 2002/0169822 | A1 | 11/2002 | Packard et al. |
| 2003/0065655 | A1 | 4/2003 | Syeda-Mahmood |
| 2003/0126136 | A1* | 7/2003 | Omoigui ............. G06F 17/3089 |
| 2004/0255232 | A1* | 12/2004 | Hammond ........ G06F 17/30873 715/207 |
| 2005/0251675 | A1 | 11/2005 | Marcjan et al. |
| 2008/0059444 | A1 | 3/2008 | Singh et al. |
| 2009/0019060 | A1 | 1/2009 | Beckerman et al. |
| 2009/0144808 | A1* | 6/2009 | Dhananjaya ........... G06Q 10/10 726/4 |
| 2009/0217196 | A1 | 8/2009 | Neff et al. |
| 2009/0292625 | A1* | 11/2009 | King ...................... G06Q 10/00 705/26.1 |
| 2011/0093453 | A1* | 4/2011 | Frayman ................ G06Q 50/18 707/723 |
| 2011/0106660 | A1* | 5/2011 | Ajjarapu ................ G06Q 30/06 705/26.41 |
| 2011/0177480 | A1 | 7/2011 | Menon et al. |
| 2011/0250580 | A1* | 10/2011 | Sandeep .................. G09B 7/02 434/362 |
| 2012/0042020 | A1 | 2/2012 | Kolari et al. |
| 2012/0185358 | A1* | 7/2012 | Ajjarapu ................ G06Q 30/06 705/26.62 |
| 2012/0231437 | A1* | 9/2012 | Fakhrai .................... G09B 7/00 434/350 |
| 2012/0244505 | A1* | 9/2012 | Lang ......................... G09B 5/06 434/322 |
| 2012/0288843 | A1* | 11/2012 | Shaffer .................... G09B 7/02 434/350 |
| 2013/0004935 | A1* | 1/2013 | Smith ...................... G09B 5/06 434/365 |
| 2013/0231980 | A1* | 9/2013 | Elgart .................... G06Q 50/20 705/7.38 |
| 2014/0019562 | A1 | 1/2014 | Chevalier et al. |
| 2014/0038163 | A1* | 2/2014 | Karpoff ..................... G09B 5/00 434/362 |
| 2014/0308646 | A1* | 10/2014 | Wurth ....................... G09B 7/04 434/350 |
| 2014/0344144 | A1* | 11/2014 | Kapoor ..................... G09B 5/00 705/39 |
| 2014/0358906 | A1 | 12/2014 | Behzadi et al. |
| 2016/0057180 | A1 | 2/2016 | Beckley et al. |
| 2016/0098638 | A1 | 4/2016 | Boyer et al. |
| 2016/0253912 | A1* | 9/2016 | Heilman .................. G09B 5/08 |

OTHER PUBLICATIONS

"Optimize the Effectiveness and Efficiency of Training Administrators and Learners"; retrieved from http://www.outstart.com/trainingedge-lms.htm; retrieved on Sep. 30, 2014.

Chen, Baiyun et al; "Investigating Instructional Strategies for Using Social Media in Formal and Informal Learning"; from retrieved http://www.irrodl.org/index.php/irrodl/article/view/1027/2073; Jan. 2012.

Essex, Sean; "Increase Informal Leaning Effectiveness Through Social Experiences", retrieved from http://www.hr.com/en/app/blog/2013/05/increase-informal-learning-effectiveness-through-s_hgla2j1f.html; May 11, 2013.

Jones, Barbara E. et al.; "Can Social Networking Tools Foster Informal Learning?"; 24th Annual Conference on Distance Teaching & Learning; Madison, Wisconsin; Aug. 2008.

Monachesi, Paola et al; "Social and informal learning support design"; Language Technologies for Lifelong Learning; Heerlen, The Netherlands; Jan. 12, 2008.

Veletsianos, Gelorge, et al.; "Online Social Networks as Formal Learning Environments: Learner Experiences and Activities"; retrieved from http://www.irrodl.org/index.php/irrodl/article/view/1078/2077; Jan. 2012.

Yasar, Orge, et al; "The power of social media in informal learning"; Education in a Technological World: Communicating Current and Emerging Research and Technological Efforts; 2011; pp. 531-538.

* cited by examiner

CREATING AND DISCOVERING LEARNING CONTENT IN A SOCIAL LEARNING SYSTEM

BACKGROUND

In a typical learning system, learning content administrators enlist experts to provide the content for formal courses. The learning content administrators produce the courses, and then make them available to learner users of the learning system. A formal course may include content objects such as videos, slide decks and textual documents, and the learning system provides learners with the ability to take the formal courses by progressing through the content objects within it. A social interaction platform allows users to share content such as microblogs, blogs, wikis, comment forums and files. It also allows users to indicate a positive valuation for a piece of content, such as a forum comment or a file, using mechanisms such as a "like" or "up vote" or a high rating. Some systems also allow a negative valuation, such as a "down vote" or a lower rating. The platform also allows users to form social networks with one another and to follow one another's microblogs, comments, likes, file uploads etc. A social learning system combines features of learning systems into a social interaction platform, essentially making a formal course into a new kind of social content. For example, if a user takes a formal course and then wants to recommend it to others in his or her social network, the user could "like" the formal course. However, the social learning system does not have the mechanisms available to learning content administrators to discover what learning content that the users deem to be of greatest pertinence to the enterprise. The learning content administrators thus have to rely on their own understanding of what the users should learn, potentially failing to cover the most pertinent learning content.

SUMMARY

According to one embodiment of the present invention, in learning content discovery in a social learning system, a creation of at least one informal course by a learning content creator is received from at least one client system in the social learning system. Each informal course comprises learning content and metadata describing the learning content and the learning content creator. Social data is received from a plurality of client systems in the social learning system for the at least one informal course. A query is received from a learning content administrator system in the social learning system comprising query parameters. At least one of the metadata and the social data are searched for one or more informal courses matching the query parameters. A list of the one or more informal courses matching the query parameters is returned as a query result.

In one aspect of the present invention, in searching at least one of the metadata and the social data and in returning the list of the one or more informal courses, the social data is analyzed to determine content quality metrics for the one or more informal courses. The list of the one or more informal courses is organized according to at least one of the content quality metrics, and the list of the one or more informal courses is returned with the content quality metrics matching the query parameters.

In one aspect of the present invention, the query parameters comprise a learning content creator expert classification. In searching at least one of the metadata and the social data and the returning the list of the one or more informal courses, the social learning system analyzes the metadata and the social data to determine learning content creator expert classifications for the one or more informal courses. The list of the one or more informal courses with the learning content creator expert classification metadata matching the learning content creator expert classification query parameter is returned.

In one aspect of the present invention, the query parameters comprise at least one of a subject area and an audience segment. In searching at least one of the metadata and the social data and the returning of the list of the one or more informal courses, the social learning system analyzes the metadata to determine at least one of a subject area and an audience segment of the one or more informal courses, and returns the list of the one or more informal courses with at least one of a subject area metadata and the audience segment metadata matching the at least one of the subject area and the audience segment query parameters.

In one aspect of the present invention, the query is received from at least one of a configurable query interface component and a configurable dashboard monitoring component of the learning content administrator system. The list is returned to the at least one of the configurable query interface component and the configurable dashboard monitoring component of the learning content administrator system.

In one aspect of the present invention, the social learning system receives an indication of an informal course from the returned list of the one or more informal courses, and incorporates the learning content of the indicated informal course into a formal course in a formal learning system.

In one aspect of the present invention, the learning content of the received at least one informal course further comprises a survey form as a testing mechanism for the learning content.

System and computer program products corresponding to the above-summarized methods are also described and claimed herein.

DETAILED DESCRIPTION

Figure 1:
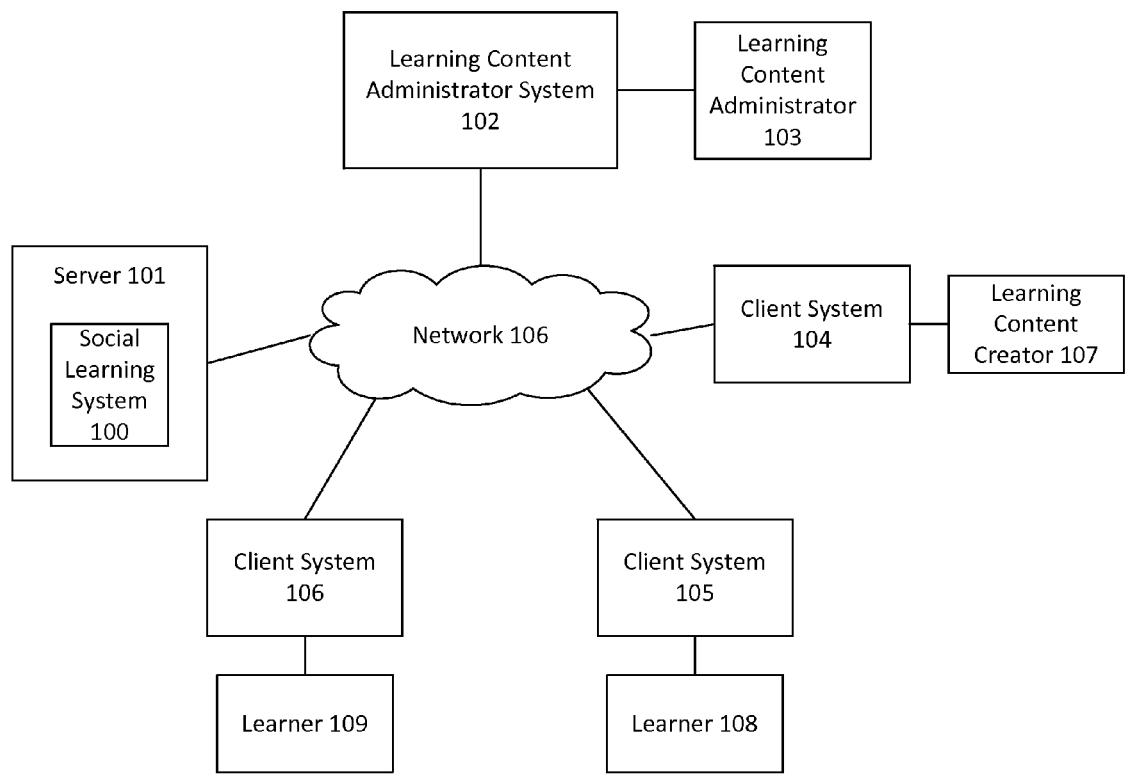
FIG. 1 illustrates a social learning system according to embodiments of the present invention.

FIG. 1 illustrates a social learning system according to embodiments of the present invention. The social learning system 100, hosted by one or more servers 101, is a social computing platform which provides social learning functionality accessible to a learning content administrator system 102 and a plurality of client systems 104-106. Using the learning content administrator system 102, a learning content administrator 103 may access and manage formal courses on the social learning system 100 or on another system (not shown). "Formal courses", as used in this specification, refers to courses provided by an institution or enterprise by following a specific curriculum or compliance requirements. A "learning content administrator", as used in this specification, refers to a user who develops the formal courses and content for formal learning. A learning content creator 107, using client system 104, may create informal courses and define the learning content that is to be in the informal courses. "Informal courses", as used in this specification, refers to out-of-curriculum courses created by learning content creators 107 and shared with learners 108-109 of the social learning system 100. "Learners", as used in this specification, refer to users of the social learning system 100 who can access the informal courses. The social learning system 100 thus includes mechanisms for informal learning, as well as social media mechanisms that enable users at the client systems 104-106 to engage, share ideas, share content, and collaborate.

The social learning system 100 equips the learning content creator 107 with the ability to define the learning content within an informal course, to share it with learners 108-109, and to define some of the metadata associated with the informal course. The social learning system 100 further equips the learners 108-109 with the ability to crowd-source knowledge of the informal courses defined within the social learning system 100, through the use of social media mechanisms. The social learning system 100 further equips the learning content administrator 103 with a configurable analytic query mechanism that enables them to find the informal courses that match their query parameters. Through the combination of the above, the learning content administrator 103 is able to discover informal course that the learning content creators 107 consider to be relevant to the learners 108-109 and potentially integrate the informal courses into formal courses. Thus, the learning content administrator 103 does not have to rely solely on his or her own understanding of what is relevant to the learners 108-109.

Figure 2:
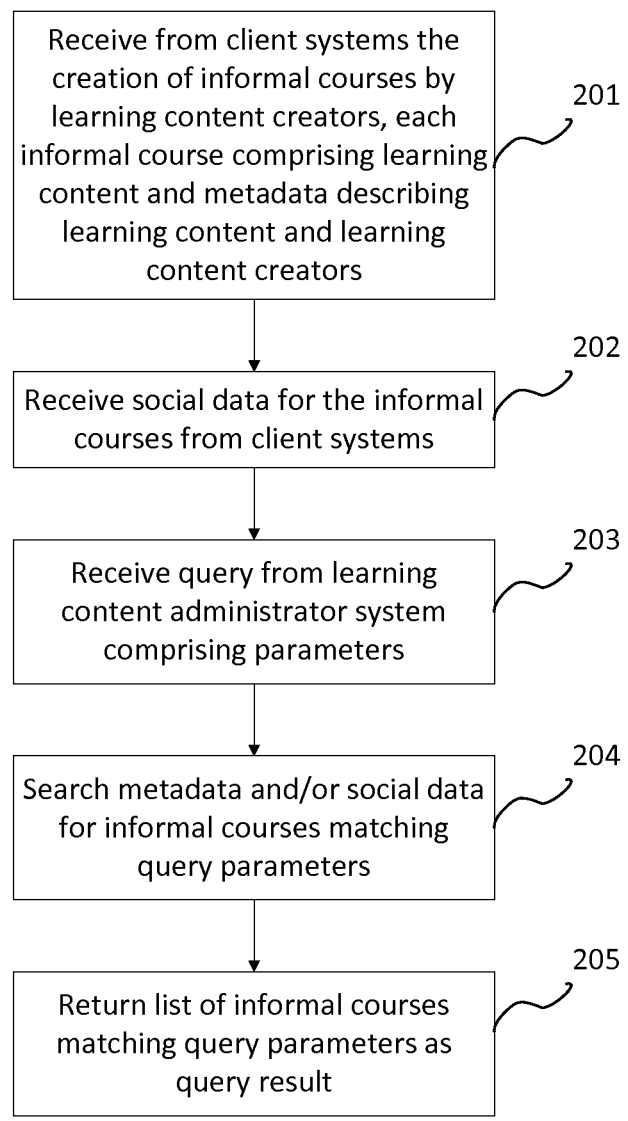
FIG. 2 is a flowchart illustrating a method for analyzing learning content in a social learning system according to embodiments of the present invention.

FIG. 2 is a flowchart illustrating a method for analyzing learning content in a social learning system according to embodiments of the present invention. The social learning system 100 receives from client system 104 the creation of informal courses by learning content creator 107 (201), and these informal courses are shared with the learners 108-109. Each informal course comprises learning content and metadata describing the learning content and the learning content creator. For example, the informal course can be a "play list" or file folder containing files, such as videos, slide decks, textual documents, etc. Optionally, when a survey form capability is provided, the survey forms may be used in the informal course as a pre-test, post-test, or some other assessment mechanism. Notifications of the completion of the survey form may be communicated to the appropriate party. Metadata, in the form of "tags", may be created to define the audience segment (e.g. "Managers", "Developers" and "Testers" or "Doctors", "Nurses", and "Paramedics") and expertise or interest subject area (e.g. "Analytics", "Big Data", and "Cognitive Computing" or "Cardiology", "Neurology" and "Oncology") for the informal course. Metadata describing the learning content creator may include the creator's title, business unit or division, expertise subject area classifications, functional roles corresponding to audience segments, and other identifying information.

The social learning system 100 also receives social data for the informal courses from the client systems 104-106 (202). The social data may be collected through social media mechanisms, such as likes, ratings, up-voting/down-voting, and comments. The social learning system 100 may collect social data from other social platforms, such as references to the informal course in blogs, wikis, and links. Metadata describing the learner who contributes the social data may also be collected. At some point, the social learning system 100 receives a query from the learning content administrator system 102 which includes parameters (203). The specific parameters depend on the type of informal courses the learning content administrator 103 wishes to find. The social learning system 100 searches the metadata and/or social data for the informal courses that match the query parameters (204). The learning content may also be searched based on additional query parameters. A list of the informal course matching the query parameters are returned to the learning content administrator system 102 as the query result (205). The learning content administrator 103 may use the query result to better understand emerging trends, best practices, and relevant topics for learning content from the learners themselves. Optionally, the learning content of one or more informal courses returned may be automatically imported into a formal course design or preparation system (not shown).

Embodiments of the present invention equip the learning content administrator system 102 with configurable analytic query mechanisms as part of a configurable dashboard monitoring component and/or a configurable query interface component. The configurable dashboard monitoring/query interface component may be configured in a number of ways. For example, it may be configured with subject areas and/or audience segments as possible query parameters, and the configurable dashboard monitoring/query interface component may display what informal courses in these configured areas are trending in terms of the social data (such as a high number of views, likes, or high ratings). Optionally, the results may be further filtered by dates or a date range. The results of the query issued from the configurable dashboard monitoring/query interface component may be sent to a reporting component rather than displayed. In one embodiment, the reporting component may produce an analysis on the list or email/print the list to one or more recipients.

Figure 3:
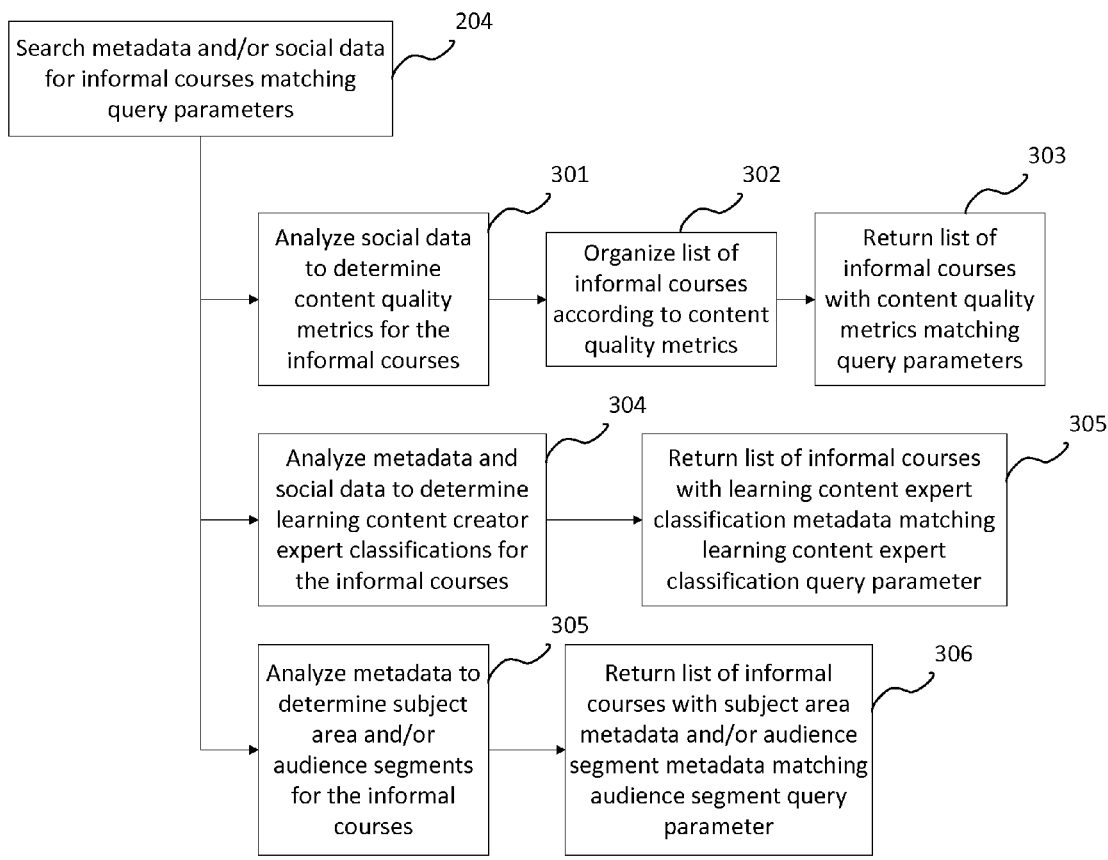
FIG. 3 illustrates some example analytic query mechanisms according to embodiments of the present invention.

FIG. 3 illustrates the application of some example analytic query mechanisms to filter the informal courses according to embodiments of the present invention. In applying one or more content quality metrics as configured by the learning content administrator 103 through the configurable dashboard monitoring/query interface component, the social learning system 100 may analyze the social data to determine content quality metrics for the informal courses (301). Sentiment data, such as likes, ratings, and up/down votes for the informal courses are collected by the social learning system 100. Sentiment analysis is then used to calculate the content quality metrics for the informal courses based on the sentiments expressed by the learners 108-109. The sentiment data may be weighted according to the expertise or role of the learner providing the sentiment data. For example, a like/rating/vote from an expert in the topics covered by the informal course would be given greater weight than that from a non-expert. Unstructured comments and mentions of the particular informal course may also be analyzed to calculate a positive or negative rating for the content of the particular informal course, and this rating may be considered in calculating the content quality score. The informal courses with content quality metrics matching the query parameters is then returned as part of the query result (303).

In applying the learning content creator expert classification as configured by the learning content administrator 103 through the configurable dashboard monitoring/query interface component, the social learning system 100 may analyze the metadata and social data to determine the learning content creator expert classifications for the informal courses (304). For example, the status of a learning content creator may be based on crowd-sourcing, i.e., the expressed social belief about the expertise of the learning content creator in the subject area(s) of the informal course. The social learning system 100 can be configured to obtain this information from internal sources, such as personnel files, organizational hierarchy data, and internal enterprise social business platforms. The social learning system 100 can also be configured to obtain this information from external sources, such as profiles and/or endorsement of skills from other social networking platforms, publications by the learning content creator, and patent systems for patents or applications with the learning content creator as an inventor. For example, an informal course on software engineering that receives positive sentiment data from senior engineers can be assigned a higher expert classification than an informal course that receives positive sentiment data from junior engineers. A list of the informal courses with learning content creator expert classifications metadata matching the learning content creator expert classification query parameter may then be returned as part of the query result (305).

In applying the audience segment as configured by the learning content administrator 103 through the configurable dashboard monitoring/query interface component, the social learning system 100 may analyze the metadata to determine the subject area and/or the audience segments for the informal courses (306). Configurability of the query for subject area and/or audience segment allows a learning content administrator 103 to find the most pertinent informal course based on corporately defined strategic objectives. For example, the learning content administrator 103 may be interested in forming a formal course targeted for people of a particular rank, band, role, geography, or language, in which case, the recommendations of informal courses from learners of that rank, band, role, geography, or language may be given more weight. A list of the informal courses with subject area metadata and/or audience segment metadata matching the audience segment query parameter is then returned as part of the query result (306).

The learning content administrator 103 may configure the analytic query mechanisms (301-303, 304-305, 306-307) alone or in any combination, to discover the informal courses that match their query parameters. For example, the configurable dashboard monitoring/query interface component offers expertise classification, subject area, audience segment, and one or more content quality metrics as possible query parameters. The learning content administrator 103 configures the expertise classification, subject area, audience segment parameters, and/or one or more content quality metrics. The informal courses are then filtered according to the expertise classification subject area, and audience segment parameters. The filtered informal courses are then furthered filtered or organized according to the configured content quality metric(s). The final list of informal courses is then returned as the query result.

A method and system for analyzing learning content in a social learning system is disclosed. Learning content administrators are able to discover informal courses that have relevance according to the query parameters and would be able to take further actions with these informal courses. The learning content administrators do not have to rely solely on their own understanding of what courses would be effective for the learners to take. With the embodiments of the present invention, learning content administrators are able to discover the best practices that the wider array of experts and/or learners in the larger enterprise deem to be most effective. The learning content administrators thus are able to harvest crowd-sourced knowledge to enable broader circulation of relevant courses and greater effectiveness.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
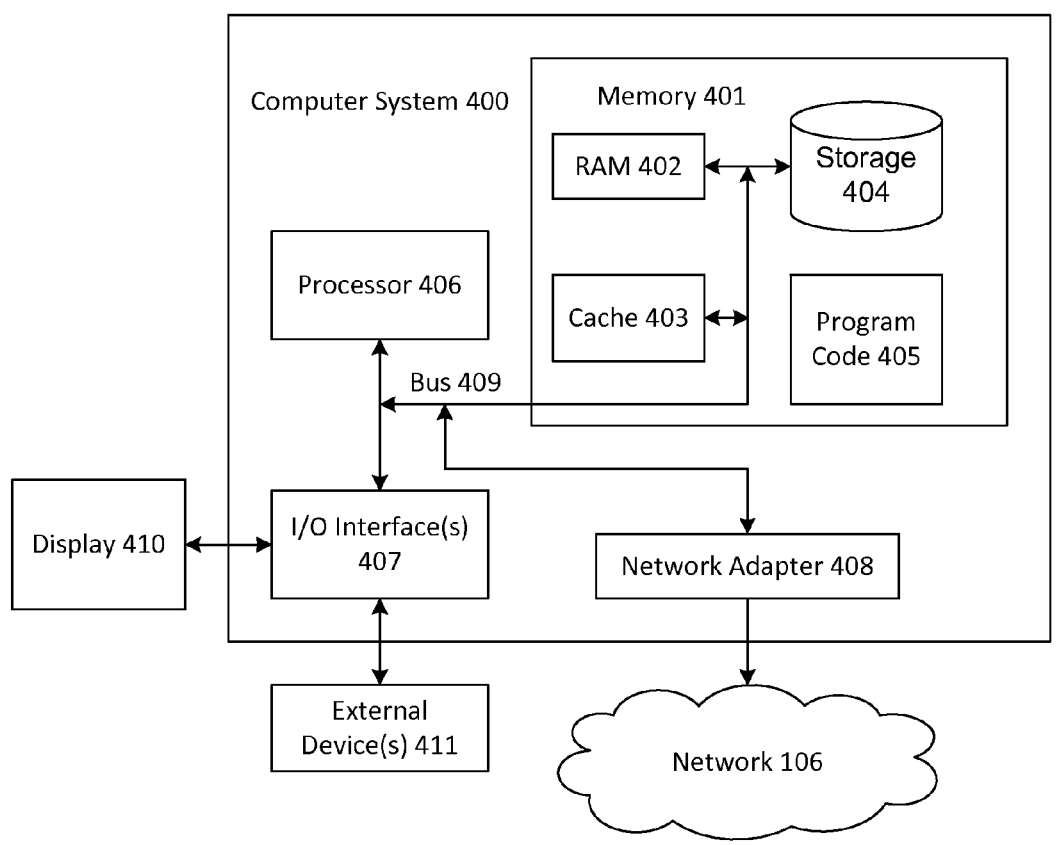
FIG. 4 illustrates a computer system according to embodiments of the present invention.

FIG. 4 illustrates a computer system according to embodiments of the present invention. The server 101, administrator system 102, and learner client systems 104 may comprise the illustrated computer system 400. The computer system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or non-volatile storage media 404. The memory may include at least one program product having a set of at least one program code module 405 that are configured to carry out the functions of embodiment of the present invention when executed by the processor 406. The computer system 400 may also communicate with one or more external devices 411, such as a display 410, via I/O interfaces 407. The computer system 100 may communicate with one or more networks 106 via network adapter 408.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for learning content discovery in a social learning system, comprising:

providing, by the social learning system: social learning mechanisms and social media mechanisms accessible to a learning content administrator system, a plurality of learner client systems, and at least one learning content creator client system; one or more formal courses in a given curriculum provided by an institution or enterprise and managed by the learning content administrator system; and an analytic query mechanism configurable by the learning content administrator system;

receiving, from the at least one learning content creator client system via the social learning mechanisms, one or more informal courses not in the given curriculum and created by a learning content creator, each informal course comprising learning content and metadata describing the learning content and the learning content creator;

providing, by the social learning system, access to the one or more informal courses to the plurality of learner client systems;

receiving, from the plurality of client systems via the social media mechanisms, social data for the one or more informal courses;

receiving, from the learning content administrator system via the analytic query mechanism, a query comprising query parameters for types of informal courses relevant to the given curriculum;

analyzing, by the social learning system, the metadata and the social data for one or more informal courses to determine which of the one or more informal courses match the query parameters;

returning, by the social learning system, a list of the one or more informal courses matching the query parameters as a query result; and automatically incorporating, by the social learning system, the learning content of the at least one informal course in the list into the given curriculum.

2. The method of claim 1, wherein the analyzing of the metadata and the social data and the returning of the list of the one or more informal courses comprise:

analyzing the social data to determine content quality metrics for the one or more informal courses;

organizing the list of the one or more informal courses according to at least one of the content quality metrics; and returning the list of the one or more informal courses with the content quality metrics matching the query parameters.

3. The method of claim 1, wherein the query parameters comprise a learning content creator expert classification, wherein the analyzing of the metadata and the social data and the returning the list of the one or more informal courses comprise:

analyzing the metadata and the social data to determine learning content creator expert classifications for the one or more informal courses; and returning the list of the one or more informal courses with the learning content creator expert classification metadata matching the learning content creator expert classification query parameter.

4. The method of claim 1, wherein the query parameters comprise at least one of a subject area and an audience segment, wherein the analyzing of the metadata and the social data and the returning of the list of the one or more informal courses comprise:

analyzing the metadata to determine at least one of a subject area and an audience segment of the one or more informal courses; and returning the list of the one or more informal courses with at least one of the subject area metadata and audience segment metadata matching the at least one of the subject area and the audience segment query parameters.

5. The method of claim 1, wherein the learning content of the received at least one informal course further comprises a survey form as a testing mechanism for the learning content.

6. The method of claim 1, wherein the analytic query mechanism is configured as part of at least one of a configurable query interface component and a configurable dashboard monitoring component, wherein the receiving of the query from the learning content administrator system comprising the query parameters and the returning of the list of the one or more informal courses matching the query parameters as the query result comprise:

receiving the query from at least one of the configurable query interface component and a configurable dashboard monitoring component; and returning the list to at least one of the configurable query interface component and the configurable dashboard monitoring component.

\* \* \* \* \*